United States Patent

[11] 3,614,669

[72] Inventors Eric John Gargini
West Drayton, England;
Communications Patents Limited

[21] Appl. No. 727,436
[22] Filed May 8, 1968
[45] Patented Oct. 19, 1971
[32] Priority May 25, 1967
[33] Great Britain
[31] 24398/67

[54] ECHO EQUALIZATION AND CHRISPENING OF TV SIGNALS WITHOUT SIGNAL DEMODULATION
7 Claims, 2 Drawing Figs.

[52] U.S. Cl. .......... 332/37, 178/5.2, 325/65, 325/137, 332/45
[51] Int. Cl. .......... H03c 1/06
[50] Field of Search .......... 332/37, 38, 48, 41, 44, 45, 58, 37 D; 325/49, 50, 137, 138, 329, 330, 467, 65; 178/5.2

[56] References Cited

UNITED STATES PATENTS

| | | | |
|---|---|---|---|
| 2,699,494 | 1/1955 | Albricht | 332/45 X |
| 2,989,707 | 6/1961 | Kahn | 332/45 |
| 3,024,312 | 3/1962 | Daguet | 325/50 X |
| 3,141,134 | 7/1964 | Osborne et al. | 332/37 X |
| 3,409,832 | 11/1968 | Van Kessel | 325/137 |
| 3,054,073 | 12/1962 | Powers | 332/48 X |
| 3,219,754 | 11/1965 | Bates et al. | 332/58 X |

*Primary Examiner*—Alfred L. Brody
*Attorney*—Laurence R. Brown

ABSTRACT: Distortion of an amplitude-modulated television signal being transmitted through a communication network is minimized by deriving a modulation component from the signal and then the modulated signal is modulated by the derived modulation component without demodulating the signal.

Figures 1, 2:
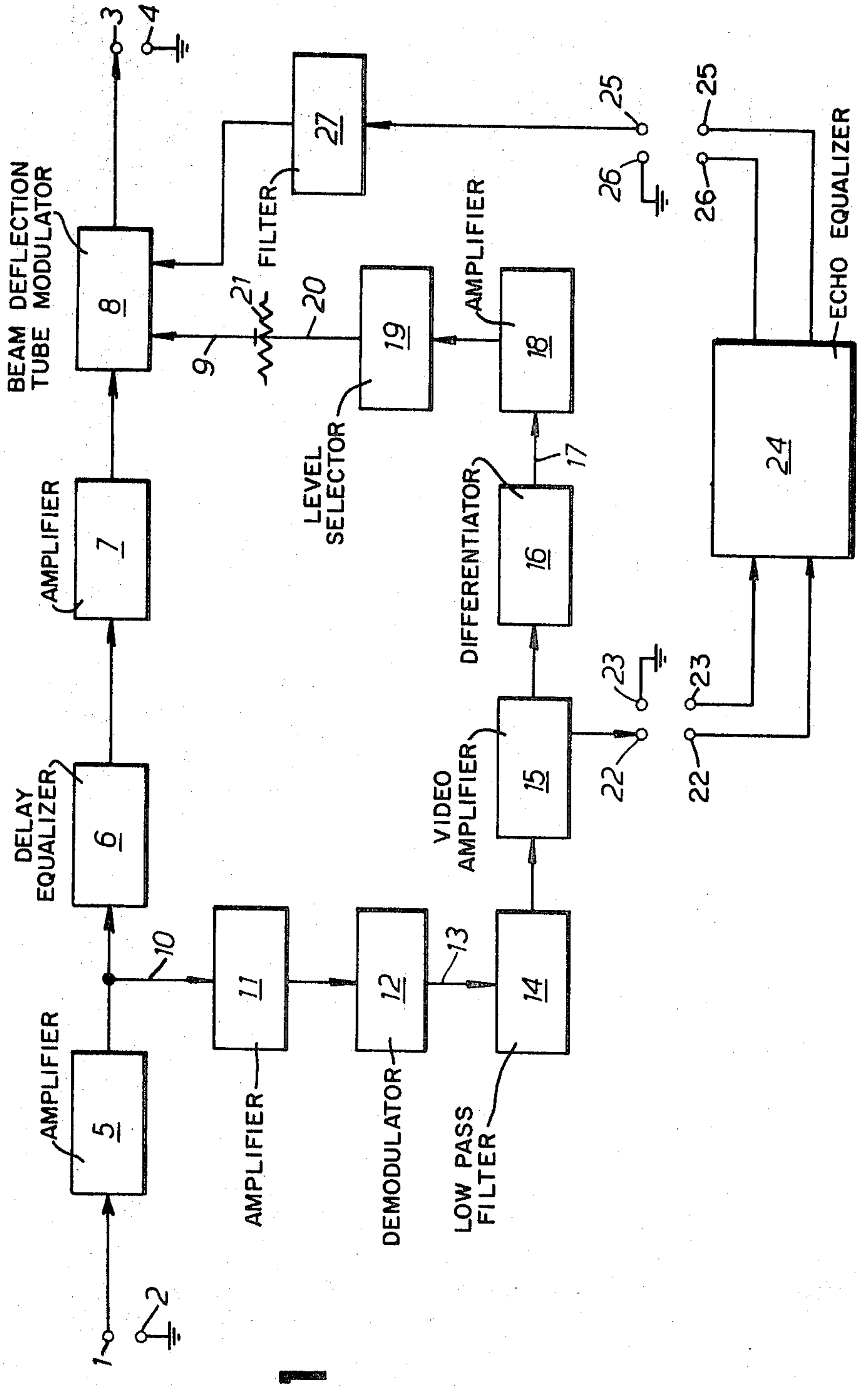

INVENTOR
Eric John Gargini
BY
Laurence R. Brown
ATTORNEY

ECHO EQUALIZATION AND CHRISPENING OF TV SIGNALS WITHOUT SIGNAL DEMODULATION

This invention relates to an electric signal processing device by means of which the modulation component of an amplitude-modulated signal may be modified. The modification of the modulation component of such signal may be useful in at least partially compensating for distortions which may be suffered by an amplitude-modulated signal during its passage through an electric signal communications system, for example due to irregularities in the transmission path or due to deficiencies in equipment which is associated with said signal path or is arranged to be responsive to said amplitude-modulated signal.

According to the invention there is provided an electric signal processing device which comprises means establishing a signal path between input and output terminals, means for deriving from an amplitude-modulated signal passing between said input and output terminals a modulation component and means for amplitude modulating said modulated signal in respect of said derived modulation component.

The means establishing a signal path between said input and output terminals of the electric signal processing device may include a beam deflection tube by means of which amplitude modulation of the signals passing along said signal path is effected. A beam deflection tube as utilized in the present invention is an electron beam tube in which current to an output electrode is controlled by the transverse movement of an electron beam.

In order that the invention may be more readily understood one particular embodiment thereof will now be described, by way of example only, with reference to the accompanying drawing which is a block schematic diagram of an electric signal processing device in accordance with the present invention.

The electric signal processing device shown in the drawing is adapted to modify the modulation component of television signals in a high-frequency wired broadcasting system, that is a system in which television signals are distributed as modulated carrier waves, the carrier waves having frequencies which lie in the range 2–12 MHz.

The modification of the modulation component of the television signals is effective in improving the subjective quality of the television pictures and in particular for counteracting the effect on the video response of television receivers connected to the wired broadcasting system of trap circuits which are incorporated in the video amplifiers thereof for the purpose of reducing the deleterious effects of cross-view. This counteraction is effected by the accentuation of the modulation components of the video signal by the device of the present invention. The accentuation of the modulation components has no effect on cross-view.

In the Drawing,

FIG. 1 is a block circuit diagram of means accentuating the modulation components of the video signal, and FIG. 2 is a block diagram of an echo equalizer circuit that may be optionally used with the circuit of FIG. 1.

In detail, the electric signal processing device comprises a pair of input terminals 1, 2 to which may be applied a television signal in the form of an amplitude-modulated carrier wave with a frequency of about 5.4 MHz. and a pair of output terminals 3, 4 from which a similar amplitude-modulated television signal may be derived. The television signal applied to the input terminals 1, 2 may be derived from the signal-originating equipment of the wired broadcasting system and the television signal derived from the output terminals 3, 4 may be passed on to the transmission network of the wired broadcasting system. Between said input and output terminals a signal path is established which comprises an electric signal amplifier 5 arranged in series with a delay equalizing device 6 which ensures that the delay encountered by the input signals is identical with that encountered by the modulation component which is derived therefrom, a further electric signal amplifier 7 and a modulator device 8. The modulator device 8 utilizes a beam deflection tube, that is an electron beam tube in which current to an output electrode is controlled by the transverse movement of an electron beam. A tube of this type is that marketed under the type number '7360' by the Radio Corporation of America. The amplifiers 5 and 7 are arranged to amplify amplitude modulated signals having carrier frequencies approximately within the range 4–11 MHz. and the degree of amplification provided by the amplifier devices 5 and 7 is so arranged that the overall gain applied to a signal passing between the input terminals 1, 2 and output terminals 3, 4 is approximately unity. The beam deflection tube modulator 8 is arranged to modulate amplitude-modulated signals passing therethrough in accordance with modulation signals applied thereto over the line 9. These modulation signals are derived from the signal path between the input terminals 1, 2 and the output terminals 3, 4 by means of a signal path 10 along which input signals, which have first been amplified by the amplifier 5 are passed to the amplifier 11. The further amplified input signals provided by the amplifier 11 are passed to a demodulator 12 which thereby provides on its output line 13 signals comprising the modulation components of the input signals applied to the terminals 1, 2. The signals at the line 13 are applied to a low pass filter 14 which is effective to prevent any color information signals which may be present in the television signals applied to the input terminals 1, 2 from appearing on the input line 9 of the modulator device 8. To this end the filter 14 is arranged to present a relatively low attenuation to modulation components having a frequency of less than 3 MHz. and to provide an increasing attenuation to modulation components whose frequencies lie above 3 MHz., maximum attenuation being arranged to occur, on television systems using the 625-line transmission standard, at the color subcarrier frequency of 4.43 MHz. The signals provided by the low pass filter 14 are applied to a video amplifier 15 which is so arranged that any synchronizing pulses present in the demodulated signals are removed. The synchronizing pulses already present in the signal passing through the device are thus unaffected when the derived modulation component is utilized to modify the original modulation component. The amplified video signals are next applied to a differentiating device 16 which is arranged to provide on its output line 17 signals which represent only the video transients which are occurring in the modulation component of the signal being processed. These transient signals on the line 17 are passed to an amplifier 18 the output of which is applied to a level-selecting device 19. This device serves to provide on its output line 20 only those portions of the differentiated video signal which lie between predetermined amplitude limits. By this means it is ensured that the modulating signal which is passed to the line 9 is devoid of components which are representative of unwanted noise in the original modulation component, which noise would deleteriously affect the signal provided at the output terminals 3, 4 of the device. The signals on the line 20 are applied to an attenuator 21, the attenuated signals therefrom being passed to the line 9. The purpose of the attenuator 21 is to permit adjustment of the degree of further modulation on the signal passing between the input terminals 1, 2 and output terminals 3, 4.

It is also possible to utilize the device described above to minimize the effects of echos which may be present in television signals which are processed thereby. To this end a portion of the amplified video signal provided by the video amplifier 15 is presented at output terminals 22, 23. Signals appearing at these terminals may be passed to an echo equalizing device 24, which may be of a known kind, and the equalized signals therefrom are applied to the electric signal processing device at the supplementary input terminals 25, 26. Signals applied to these supplementary input terminals 25, 26 are arranged to be applied to the modulator 8 through a filter 27 which is arranged to remove video components from the echo correcting signals and at the same time provide an impedance match between the echo equalizing device 24 and a modulating electrode of the device 8.

Although the apparatus described above is arranged to be effective to process television signals with carrier frequencies in the range 4-11 MHz. it is apparent that an electric signal processing device of the kind described herein may be constructed for modifying the modulation component of a wide variety of amplitude modulated carrier wave signals with carrier waves of frequencies which are as high as can be handled by the modulator device 8, say up to about 100 MHz. or more. An advantage of the electric signal processing device according to the invention is that the signal passing therethrough does not have to undergo demodulation and remodulation in order to effect the modification of its modulation component. In addition it is possible to provide at the output terminals 3, 4 amplitude modulated signals the modulation component of which is of a type which cannot be produced by conventional modulator devices.

What I claim is:

1. An electrical signal device for minimizing amplitude modulation distortions comprising in combination means providing amplitude-modulated television signals carried on a high-frequency carrier wave; amplifying means establishing a path for said signals and said carrier wave between input and output terminals, means for deriving from said amplitude-modulated signals on said carrier wave passing between said input and output terminals an amplitude modulation component of said television signals, modulator means in said path for amplitude modulating said signals and accompanying carrier wave with a further amplitude-modulated signal consisting of said derived modulation component to accentuate the amplitude modulation components in said signals on said carrier wave, and signal-conveying means passing said derived amplitude modulation component to said modulator means.

2. An electric signal processing device as claimed in claim 1 wherein the modulating means in said signal path between said input and output terminals of the electric signal processing device comprises a beam deflection tube for amplitude modulating the signals passing along said signal path.

3. An electric signal processing device as claimed in claim 2 wherein the means establishing a signal path between said input and output terminals also includes an electric signal amplifier device with attenuator means adjusted for overcoming attenuation in the signal path between said input and output terminals.

4. An electric signal processing device as claimed in claim 2 having an amplifier device with an attenuation device in the signal-conveying means wherein said means for deriving an amplitude-modulated component is arranged to derive signals from said signal path between the input and output terminals at a point between the output terminal side of the amplifier device and the input terminal side of the beam deflection tube.

5. An electric signal processing device as claimed in claim 1 including means passing the amplitude modulation component signals through a differentiating device which is arranged to provide output signals indicative of transient signals which occur in the demodulated signals to thereby accentuate transient signals in the output signals modulated by said modulator means.

6. An electric signal processing device as claimed in claim 1 including means passing the amplitude modulation component signals through a device which is effective to pass only those signal components which have amplitudes lying within a predetermined range of amplitudes devoid of components representative of unwanted noise.

7. An electric signal processing device as claimed in claim 2 wherein the signal path between said input and output terminals includes a delay device which is effective to delay signals passing between the input and output terminals by an amount corresponding to the delay which signals derived from said path encountered prior to their application to the beam deflection tube.